Feb. 14, 1961 H. J. WOLKSTEIN 2,972,079
CERAMIC SUPPORTED ELECTRODE MOUNTS
Filed Oct. 27, 1958 2 Sheets-Sheet 1

INVENTOR.
HERBERT J. WOLKSTEIN
BY
William A. Zalesak
ATTORNEY

Feb. 14, 1961  H. J. WOLKSTEIN  2,972,079
CERAMIC SUPPORTED ELECTRODE MOUNTS
Filed Oct. 27, 1958  2 Sheets-Sheet 2
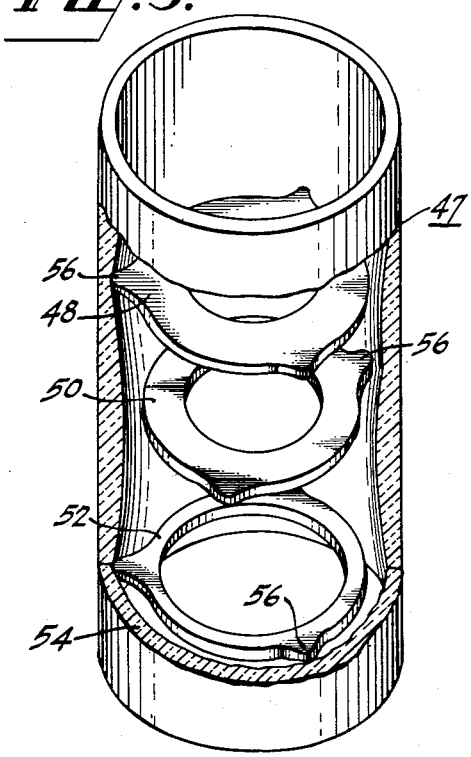
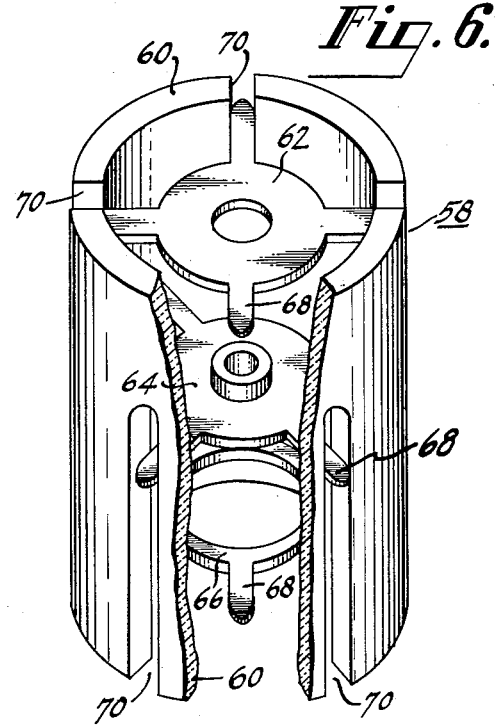
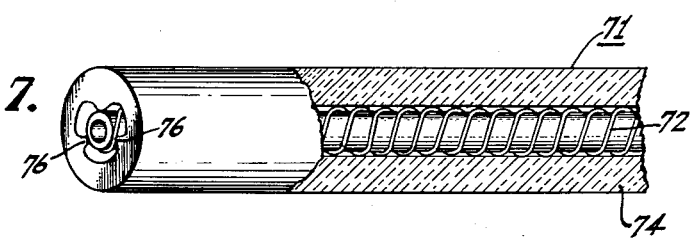
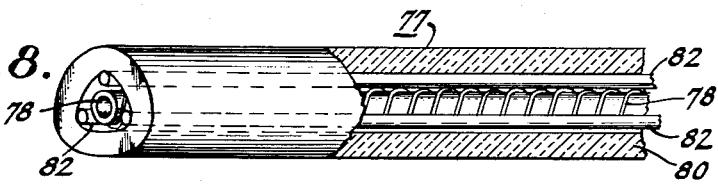
INVENTOR.
HERBERT J. WOLKSTEIN
BY
William A. Zalesak
ATTORNEY

United States Patent Office 2,972,079
Patented Feb. 14, 1961

2,972,079

CERAMIC SUPPORTED ELECTRODE MOUNTS

Herbert J. Wolkstein, Newark, N.J., assignor to Radio Corporation of America, a corporation of Delaware Filed Oct. 27, 1958, Ser. No. 769,687

13 Claims. (Cl. 315—3.5)

This invention relates to ceramic supported electrode mounts and particularly to ceramic supported electron gun and helix mounts for use in traveling wave tubes. For this reason the invention will, by way of example only, be described as incorporated in a traveling wave tube. However, it will be appreciated that the invention is limited neither to electron gun and helix mounts, nor to traveling wave tubes, but rather may be used in the fabrication of various types of electrode mounts useful generally in the manufacture of electron tubes or other related devices.

The term "ceramic" is intended to be limited to refractory articles first formed or shaped of clay in whole or in part without heat and then baked or surface fired, as distinguished from "glass" which is made by first heating the solid material to fusion or molten condition and then cooling to the desired solid form or shape in molds. The use of ceramic materials in the fabrication of electron tubes is well known and is, moreover, highly desired because of its high resistance to mechanical and thermal shock which results in extremely rugged tubes capable of high temperature bake-out. However, according to prior art teachings, the use of ceramic necessitates rather involved and costly techniques wherever the ceramic must be joined to metal electrodes or to a separate ceramic vacuum envelope member.

It is therefore an object of this invention to provide a ceramic supported electrode mount and method for fabricating such, which is both rugged and easily fabricated, which may be used either in the form of a separate support member contained within a vacuum envelope or as a combination support and vacuum envelope member, and which minimizes the necessity of costly ceramic-to-metal brazed joints.

In accordance with this object, a mechanical, rather than chemically brazed, bond is provided between one or more electrodes and a ceramic support member by shrinking the ceramic member upon and against the electrodes. To this end, volume compression or shrinkage characteristics of "green" ceramic material containing the commonly used binders is made use of. As used herein the term "green" ceramic means a ceramic mass not yet sufficiently fired to complete the shrinkage occasioned by the phenomenon hereinafter described. Such shrinkage is caused by a firing of the green ceramic at elevated temperatures. The release of binders from the ceramic mix and the fusion together of ceramic particles tends to fill voids within the ceramic aggregate and permit the desired shrinkage. The total percentage of this shrinkage relative to the initial dimensions of the green ceramic can be varied over a wide range and is dependent upon the physical and chemical nature of the ceramic mix, the particle size of the ceramic aggregate, the binder constituent, and the firing schedule.

Briefly, according to my invention, the desired electrode or electrodes are provided with predetermined outer dimensions. A green ceramic members is suitably shaped to have portions adjacent opposite sides of at least a portion of the electrode. For example, a hollow cylinder is partically prefired only enough to make it coherent and is then accurately machined to an inside diameter slightly greater by a selected amount than the predetermined outer dimensions of the electrodes. The electrodes are then aligned on a mandrel or by other suitable means in their desired ultimate relative disposition to form an electrode assembly which is then placed inside the green ceramic members. The electrode ceramic assembly is then fired to shrink the ceramic onto the electrodes to form a firm mechanical bond thereto and thereby securely mount the electrodes relative to each other and to the ceramic cylinder.

After firing of the ceramic-electrode assembly, the supporting mandrel can be physically removed by simply withdrawing it from the electrodes or, if necesary, by preferential acid etching which does not act upon the electrodes themselves. Other suitable means known in the art for removal of the mandrel can, of course, be employed. The entire assembly of electrodes and ceramic housing can then be integrated with other parts of an electron tube either within a separate vacuum envelope or with the ceramic housing itself constituting a portion of the vacuum envelope.

In the drawings:

Figs. 5 and 6 are perspective views partly broken away of electron gun mounts fabricated in accordance with the invention, and Figs. 7 and 8 are perspective views partly broken away of traveling wave tube helix mounts fabricated in accordance with the invention.

Figure 1:
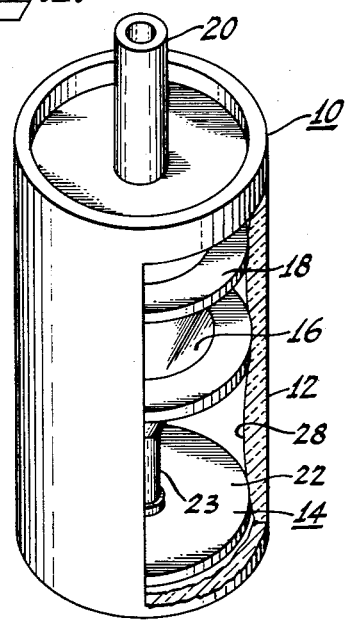
Fig. 1 is a partly-broken-away perspective view of an electron gun mount fabricated according to my invention.
Figure 2:
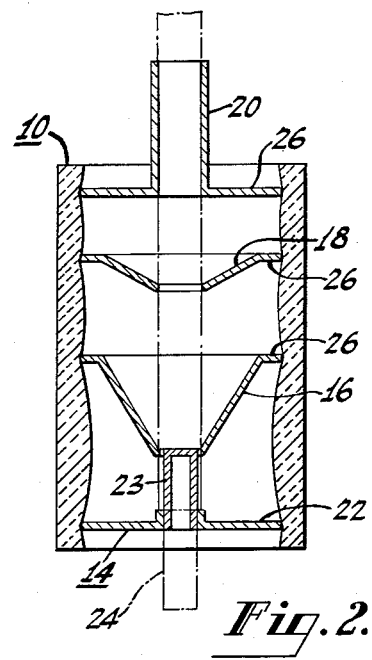
Fig. 2 is an axial section view of the electron gun mount of Fig. 1 showing a suitable mandrel in phantom for aligning the various electrodes.

Figs. 1 and 2 illustrate an electron gun mount 10 which includes a hollow cylindrical ceramic member 12 in which is mounted an electrode assembly comprising a cathode structure 14, a shield electrode 16, and first and second anode electrodes 18 and 20, respectively. The relative electrode disposition of the electron gun mount 10 is conventional and is illustrated by way of example only. The present invention hereafter described should in no way be considered as limited to such an electrode design. Fewer or more electrodes having different design features or being of a completely different type can be mounted within suitable ceramic members in accordance with the invention.

In fabricating the electron gun mount 10, the cathode structure 14 is provided in two parts consisting of a centrally apertured disk 22 and a closed ended tubular member 23. Accordingly, the disk 22 can be mounted within the ceramic cylinder 12, and then the tubular member 23, which carries electron emissive material on the closed end thereof, subsequently fixed to the disk without having to be subjected to the heat of the ceramic shrinkage step. According to the invention, a mandrel 24 is inserted through central apertures of the electrodes 16, 18, and 20 and the cathode mounting disk 22, thus accurately aligning them with each other. In addition to the cathode disk flange 23, each of the other three electrodes is provided with a circular flange portion 26 equal in outer diameter to the others. As such, the outer peripheries of the four electrodes define a cylindrical surface of predetermined diameter.

A "green" ceramic, hollow cylinder 12 is provided with an accurately machined inside peripheral surface having a diameter slightly greater than that of the predetermined diameter of the cylindrical surface defined by the four electrodes. The composition, relative size, and general nature of the green ceramic cylinder 12 will be more fully described hereinafter. The green ceramic cylinder is provided by molding a ceramic aggregate-binder mixture and then partially firing the molded mass to make it coherent and machineable. Such partial firing of the molded ceramic mass does not nearly complete the volume compression shrinkage hereinbefore described. Accordingly, subsequent firing of the partially prefired ceramic mass will cause the ceramic mass to shrink.

In order to mount the aligned electrodes 14, 16, 18, and 20 within the ceramic cylinder 12, the electrodes carried on the mandrel 24 are simply inserted into the ceramic cylinder and the assembly fired in accordance with the teachings of suitable firing schedules hereinafter described. The firing is conventional and is such that the ceramic is caused to shrink and assume a smaller inside diameter dimension which results in its closing upon the peripheral surfaces of the flanges of the four electrodes.

In Figs. 1 and 2, a ceramic cylinder 12 is shown in this shrunken condition. As illustrated, the inner cylindrical surface 28 of the ceramic cylinder 12 is shown to have shrunk to a diameter less than the outer diameter of the electrode flanges except at the peripheral locations of the four electrode flanges. Accordingly, an exceptionally firm, yet purely mechanical bond is obtained between the inside cylindrical surface 28 of the ceramic cylinder 12 and the outer peripheries of the electrodes 14, 16, 18, and 20.

One example of an electron gun structure constructed in accordance with the invention incorporates a commercially available high alumina ceramic of approximately 91% alumina and 9% mineral impurities including, e.g., calcium, magnesium and silicon. Such a ceramic composition, when provided in a predetermined particle size and mixed with a selected binder material, exhibits a shrinkage characteristic of 18.2%. This shrinkage factor is that incurred in the completion firing of the ceramic subsequent to the partial prefiring performed for the purpose of providing a coherent, machinable ceramic body. Some small amount of shrinkage occurs in the partial prefiring but this shrinkage factor may be isolated from shrinkage calculations hereinafter described in accordance with the invention.

The ceramic cylinder is provided of the described 91% alumina material and is partially prefired and machined to an inside diameter of 0.530 inch. A plurality of molybdenum electrodes are provided with outer diameter dimensions of 0.480 inch. Subsequent to placing of the electrodes within the ceramic cylinder, firing of the ceramic-electrode assembly serves to shrink the ceramic cylinder to an internal diameter of 0.450 inch thus securely closing the ceramic upon the electrodes.

In another embodiment of an electron gun structure made using the 91% alumina ceramic, the ceramic cylinder was provided with an internal diameter of 0.780 inch. A plurality of molybdenum electrodes having outer diameter dimensions of 0.674 inch were mounted by shrinkage firing of the ceramic electrode assembly.

The relationship of expansion co-efficients of the ceramic and the electrode members constitute an important consideration in producing the best ceramic-electrode structures. Ordinarily, ceramics have a relatively low coefficient of thermal expansion compared to that of suitable electrode metals. However, it is preferred that the ceramic be chosen to have a slightly greater co-efficient thermal expansion than that of the electrode metal. Thus, as the ceramic-electrode assembly is cooled from the shrinkage fabrication temperature, the ceramic will contract more than the metal electrodes. This insures that the electrodes will not thermally contract out of firm contact with the ceramic. Subsequent elevated temperatures incurred in operation of the device are never great enough to cause the ceramic to thermally expand out of contact with the electrodes. Although a higher ceramic co-efficient of thermal expansion is preferred, it should not be so much greater than that of the metal electrodes as to result in differential shrinkage and expansion problems during fabrication of the electrode assembly. The 91% alumina ceramic and molybdenum electrodes provide a suitable choice of materials insofar as this consideration is concerned.

Figure 3:
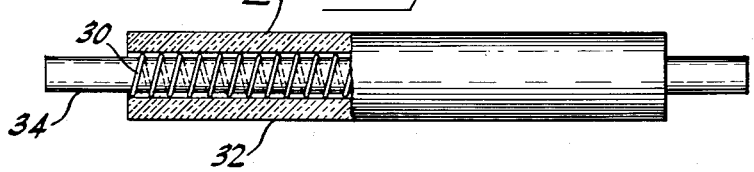
Fig. 3 is a perspective view partly broken away of a traveling wave tube helix mount illustrated with a supporting mandrel fabricated according to my invention.

Fig. 3 illustrates a traveling wave tube helix structure 29 comprising a helix conductor 30 mounted within a hollow ceramic cylinder 32 in accordance with my invention. As such, the helix conductor 30 is first placed on a precision mandrel 34 and then inserted in a green ceramic hollow cylinder 32 and fired to produce the shrinkage phenomenon. The factors of ceramic shrinkage and the considerations of fabrication are the same as those encountered in the previously described electron gun fabrication. The ceramic cylinder 32 might comprise either the envelope of an electron tube or simply a mounting structure contained within a separate vacuum envelope.

Figure 4:
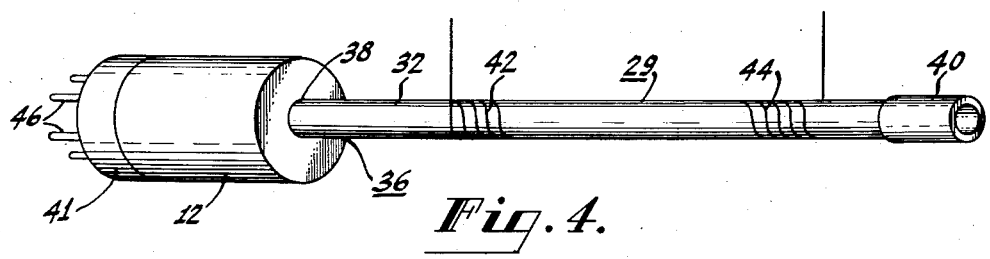
Fig. 4 is a perspective view of a traveling wave tube incorporating electrode mounts fabricated according to the invention.

Fig. 4 illustrates a traveling wave electron tube such as might be fabricated according to my invention. The traveling wave tube 36 might, for example, comprise the electron gun structure 10 of Fig. 1 and the helix structure 29 of Fig. 2. Two such structures are axially aligned and the ceramic cylinders 12 and 32 thereof vacuum sealed together at their abutting surfaces 38. A conventional electron collector electrode 40 is sealed at the end of the helix mount 29 remote from the electron gun mount 10 and a stem structure 41 is sealed to the open end of the electron gun mount 10. Suitable input and output devices shown schematically as coupling coils 42 and 44, respectively, are provided for coupling energy onto and off of the helix 30. Also, suitable lead-in prongs 46 and connections thereto from the internal tube electrodes are provided in conventional manner.

Figs. 5 and 6 show alternative embodiments of electron gun structures according to my invention. In Fig. 5, an electron gun mount 47 comprises a plurality of electrodes 48, 50, and 52 which are mounted within a hollow ceramic cylinder 54. Each of the electrodes 48, 50, and 52 is provided with a plurality, e.g., three, of peripheral projections 56, for contacting the internal surface of the ceramic cylinder 54. In their mounted disposition, each of the electrodes 48, 50, and 52 are angularly disposed relatively to the adjacent electrode by a 60° amount. Accordingly, the greatest possible length of electrical leakage path between electrodes is provided. It will be appreciated that more than three mounting projections 56 could be provided on an electrode or that they might be spaced other than at 120° disposition thereon.

Fig. 6 illustrates the versatility of my invention wherein an electron gun mount 58 comprises a slotted hollow ceramic cylinder 60 and a plurality of electrodes 62, 64, and 66 mounted therein. Each of the electrodes 62, 64, and 66 is provided with a plurality of radially extending fingers 68 which are fitted into accommodating longitudinal slots 70 in the ceramic cylinder 60. In order to provide maximum leakage resistance between electrodes, the slots 70 for each electrode are angularly staggered around the ceramic cylinder. The embodiment of Fig. 6 provides not only the feature of good electrical resistance between electrodes but also an exceptionally firm contact between the ceramic cylinder 60 and the extending fingers 68 of the electrodes. It will be appreciated that in the electron gun mount 58 of Fig. 6, shrinkage of the ceramic results in a narrowing of the width of the slots 70 to close upon the mounting fingers 68 of the various electrodes.

Fig. 7 illustrates a traveling wave tube helix mount 71 wherein a helical conductor 72 is mounted within an internally fluted ceramic cylinder 74. The ceramic cylinder 74 is provided with a plurality, e.g., three, of internal flutes 76, so that the helix conductor 72 is contacted only in a series of points rather than continuously therealong. Such a mounting serves to reduce the degree of dielectric loading and to provide uniform phase velocities with frequency variation. The shrinkage of the ceramic cylinder 74 is similar to that described with respect to Figs. 1, 3, 5, and 6.

Fig. 8 shows a helix mount 77 in which a helical conductor 78 is mounted by shrinking a green ceramic cylinder 80 on an electrode assembly comprising the helical conductor 78 and a plurality, e.g., three, of ceramic rods 82, which have been previously dimensionally stabilized by a prefiring to complete the shrinkage thereof. Accordingly, the shrinkage firing of the ceramic cylinder 80 does not effect a dimensional change in the rods 82. Such a structure has the advantage of improved uniformity of contact and, hence, dielectric loading between the helix 78 and the contacting ceramic members 82. The apparent, somewhat triangular shape of the ceramic cylinder 80 is due to the shrinkage over the three rods 82.

It will be appreciated that in all of the embodiments of my invention herein described precision dimensioned ceramic mounting cylinders need not be provided. This is true since the ceramic, in shrinking to a smaller size than the outer dimension of the electrodes contained therein, will automatically adjust to the electrode size.

What is claimed is:

1. An electrode mount comprising an electrode and a tubular ceramic member shaped and sized to receive said electrode in mating relation therewith, said electrode being disposed in mating relation with said ceramic member and said ceramic having been shrunk upon said electrode to contact and to securely mount said electrode relative to said ceramic member solely by virtue of the mechanical bond between said electrode and said ceramic member effected by the shrinkage of said ceramic member, the coefficients of thermal expansion of said electrode and said ceramic member being so related that said parts will not separate due to differential expansion or contraction during fabrication of said mount.

2. An electrode mount comprising a hollow ceramic cylinder and a plurality of electrodes having predetermined outer dimensions disposed concentrically within said cylinder in axial spaced relation, said cylinder having been shrunk upon said electrodes to securely mount said electrodes relative to said cylinder, the coefficients of thermal expansion of said ceramic cylinder and said electrodes being so related that said parts will not separate due to differential expansion or contraction during fabrication of said mount.

3. An electrode mount comprising a hollow ceramic cylinder and a plurality of electrodes each having a plurality of radially extending peripheral fingers mounted in axially spaced relation within said cylinder, said ceramic cylinder having a plurality of longitudinal slots receiving said peripheral fingers of said electrodes, said ceramic cylinder having been shrunk to close said slots upon said peripheral fingers to securely mount said electrodes relative to said ceramic cylinder.

4. An electrode mount comprising a plurality of electrodes each having a plurality of radially extending peripheral projections, said electrodes being axially spaced within a hollow ceramic cylinder which has been shrunk into mounting contact with said peripheral projections, said electrodes being so mutually angularly oriented within said cylinder that the distance between any one peripheral projection of one electrode and any one peripheral projection of any other electrode is greater than the axial spacing between those two electrodes.

5. A helix mount for a traveling wave tube comprising an elongated hollow ceramic cylinder and an elongated helical conductor disposed concentrically within said ceramic cylinder, said ceramic cylinder having been shrunk upon said helical conductor to securely fix said conductor relative to said cylinder solely by virtue of the mechanical bond therebetween effected by the shrinkage of said ceramic cylinder, the coefficients of thermal expansion of said ceramic cylinder and said helical conductor being so related that said parts will not separate due to differential expansion or contraction during fabrication of said mount.

6. A helix mount for a traveling wave tube comprising a hollow ceramic cylinder, a helical conductor disposed concentrically therein, and a plurality of ceramic ridge elements extending longitudinally along and within said ceramic cylinder in contact with said helical conductor at positions spaced around said helical conductor, said ceramic cylinder having been shrunk to force said ridge elements radially inward into contact with said helical conductor and thereby securely fix said conductor relative to said cylinder solely by virtue of the mechanical bond therebetween effected by the shrinkage of said ceramic cylinder.

7. The method of securing an electrode assembly to a ceramic mount member comprising the steps of disposing a pre-formed tubular green ceramic member with portions thereof adjacent opposite sides of at least a portion of said electrode assembly, and firing said green ceramic member to shrink said member upon said electrode assembly, the coefficients of thermal expansion of said ceramic cylinder and said helical conductor being so related that said parts will not separate due to differential expansion or contraction during fabrication of said mount.

8. The method of fabricating an electrode mount comprising the steps of positioning a plurality of electrodes in their ultimate desired mutual disposition, placing portions of said electrodes between portions of a pre-formed tubular green ceramic member, and firing said ceramic member to shrink said ceramic member onto said electrodes.

9. A method of securing an electrode to a ceramic mount member comprising the steps of shaping and sizing a tubular green ceramic member to receive said electrode in mating relation, inserting at least a portion of said electrode within said shaped and sized green ceramic member in mating relation therewith and firing said green ceramic member to shrink same onto said portion of said electrode.

10. A method of fabricating an electron gun mount, which includes a plurality of circular electrodes mounted concentrically within a hollow cylindrical ceramic member, comprising the steps of aligning said electrodes in their desired mutual disposition, inserting said aligned electrodes within a hollow green ceramic cylinder which has been previously shaped and partially fired to receive said electrodes in a predetermined mating fit, and firing said ceramic while maintaining said electrode alignment to shrink said ceramic onto said aligned electrodes.

11. The method of fabricating an electrode mount wherein at least one electrode having outer surfaces of predetermined dimensions is securely supported within a tubular ceramic member against mating surfaces thereof comprising the steps of machining a tubular green ceramic member to provide mating surfaces of slightly greater sizes than said predetermined dimensions, inserting said electrode within said ceramic member in desired mounting orientation relative thereto, and firing the electrode and ceramic assembly to shrink said ceramic mating surfaces against said electrode outer surfaces to firmly support said electrode within said ceramic member.

12. The method of fabricating a ceramic supported helix mount for a traveling wave tube in which a helical conductor is mounted concentrically within a hollow ceramic cylinder, comprising the steps of, shaping and partially firing a hollow green ceramic cylinder to provide internal surface portions of a dimension selectively greater than the outer diameter of said helical conductor, disposing said helical conductor concentrically over a cylindrical mandrel, inserting said mandrel and helical conductor assembly generally concentrically within said shaped green ceramic cylinder, then firing said cylinder to shrink same onto said helical conductor.

13. An electrode mount as in claim 1, wherein said electrode is made of molybdenum, and said ceramic member is made of a ceramic including approximately 91% alumina.

References Cited in the file of this patent

UNITED STATES PATENTS

| | | |
|---|---|---|
| 2,706,366 | Best | Apr. 19, 1955 |
| 2,845,690 | Harrison | Aug. 5, 1958 |
| 2,879,436 | Geisler | Mar. 24, 1959 |

FOREIGN PATENTS

| | | |
|---|---|---|
| 767,563 | Great Britain | Feb. 6, 1957 |